United States Patent
Tu et al.

(10) Patent No.: US 10,338,725 B2
(45) Date of Patent: Jul. 2, 2019

(54) WET INK PREDICTOR

(71) Applicant: MICROSOFT TECHNOLOGY LICENSING, LLC, Redmond, WA (US)

(72) Inventors: Xiao Tu, Medina, WA (US); Fei Xiong, Redmond, WA (US); Jianfeng Lin, Redmond, WA (US); Patrick Jee-An Poon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 14/856,167

(22) Filed: Sep. 16, 2015

(65) Prior Publication Data
US 2016/0092021 A1 Mar. 31, 2016

Related U.S. Application Data

(60) Provisional application No. 62/057,025, filed on Sep. 29, 2014.

(51) Int. Cl.
*G06F 3/041* (2006.01)
*G06F 3/0488* (2013.01)
(Continued)

(52) U.S. Cl.
CPC .......... *G06F 3/0416* (2013.01); *G06F 3/0237* (2013.01); *G06F 3/03545* (2013.01);
(Continued)

(58) Field of Classification Search
CPC ............. G06F 3/03545; G06F 3/04883; G06F 17/242; G06F 3/044; G06F 3/017;
(Continued)

(56) References Cited

U.S. PATENT DOCUMENTS 6,771,266 B2 8/2004 Lui et al.
7,437,003 B1 10/2008 Gorbatov et al.
(Continued)

FOREIGN PATENT DOCUMENTS

EP 2482177 A2 8/2012
WO 2008097024 A1 8/2008

OTHER PUBLICATIONS

"International Search Report and Written Opinion Issued in PCT Application No. PCT/US2015/051828", dated Mar. 2, 2016, 16 Pages.

(Continued)

*Primary Examiner* — Dong Hui Liang
(74) *Attorney, Agent, or Firm* — Shook, Hardy & Bacon LLP

(57) ABSTRACT

Systems and methods are provided for improving the latency for display of ink during user creation of ink content with an object, such as a stylus, mouse, finger (or other touch input), or other drawing device. In order to reduce or minimize the time for display of ink content created by a user, aspects of the technology described herein generate predictive wet ink that can be displayed with actual wet ink. The predictive wet ink is calculated by extending an active ink segment a predictive distance. The predictive distance is intended to be a distance between a termination ink point for an active wet ink segment and a tip of the writing object. In one aspect, the predictive distance is calculated by determining the current latency period on a touch device and the velocity of the writing object.

20 Claims, 10 Drawing Sheets

(51) Int. Cl.
*G06F 3/023* (2006.01)
*G06F 3/0354* (2013.01)
*G06F 17/24* (2006.01)
*G06K 9/22* (2006.01)
*G06K 9/00* (2006.01)
*G06K 9/30* (2006.01)

(52) U.S. Cl.
CPC .......... *G06F 3/0412* (2013.01); *G06F 3/0414* (2013.01); *G06F 3/04883* (2013.01); *G06F 17/242* (2013.01); *G06K 9/00402* (2013.01); *G06K 9/00416* (2013.01); *G06K 9/222* (2013.01); *G06F 2203/04104* (2013.01); *G06F 2203/04106* (2013.01); *G06K 9/30* (2013.01)

(58) Field of Classification Search
CPC .... G06F 3/0237; G06F 3/0412; G06F 3/0414; G06F 2203/04104; G06F 2203/04106; G06F 7/544; G06F 19/00; G06K 9/222; G06K 9/00402–9/00436; G06T 11/203
See application file for complete search history.

(56) References Cited

U.S. PATENT DOCUMENTS

| | | | |
|---|---|---|---|
| 7,450,125 B2 | 11/2008 | Wang et al. | |
| 8,014,630 B1 | 9/2011 | Polyakov et al. | |
| 2004/0140962 A1 | 7/2004 | Wang et al. | |
| 2008/0180410 A1* | 7/2008 | McCall | G06T 11/203 345/179 |
| 2011/0304643 A1 | 12/2011 | Marison | |
| 2011/0310118 A1* | 12/2011 | Asmi | G06F 3/04883 345/619 |
| 2012/0256944 A1* | 10/2012 | Crumly | G06K 9/222 345/611 |
| 2013/0127756 A1* | 5/2013 | Wang | G06F 3/0488 345/173 |
| 2013/0136377 A1* | 5/2013 | Luo | G06T 5/00 382/275 |
| 2013/0271487 A1* | 10/2013 | Lincoln | G06F 3/0488 345/619 |
| 2014/0118295 A1* | 5/2014 | Motoi | G06F 3/04883 345/174 |
| 2014/0160068 A1 | 6/2014 | Westerman et al. | |
| 2014/0253475 A1* | 9/2014 | Han | G06F 3/03545 345/173 |
| 2015/0242115 A1* | 8/2015 | Gao | G06F 3/0416 345/173 |

OTHER PUBLICATIONS

"International Preliminary Report on Patentability Issued in PCT Application No. PCT/US2015/051828", dated Oct. 4, 2016, 6 Pages.

Henzen, et al., "Sketching with a Low-latency Electronic Ink Drawing Tablet", In Proceedings of the 3rd International Conference on Computer Graphics and Interactive Techniques, Nov. 30, 2005, 10 pages.

Hu, et al., "Optimization of Point Selection on Digital Ink Curves", In Proceedings of the 2012 International Conference on Frontiers in Handwriting Recognition, Sep. 2012, 6 pages.

"Office Action Issued in European Patent Application No. 15778818.3", dated Jan. 23, 2018, 6 Pages.

* cited by examiner

WET INK PREDICTOR

RELATED APPLICATIONS

This application claims benefit of U.S. Provisional Application No. 62/057,025, filed Sep. 29, 2014, titled "WET INK PREDICTOR," which application is herein incorporated by reference.

BACKGROUND

A tablet computing device (or a similar type of embedded device) often contains a touchscreen that allows a user to enter data into the device. Data entry by the user may be done using a writing object, such as a finger or a stylus (or pen). Input from the writing object to the device is displayed as "ink."

Ink is digitized to allow it to be processed and manipulated by the computing device and displayed. This can be performed by sending out the digitized ink to the operating system on the device, having the processor process the ink, and then sending the processed ink to a graphics card. The graphics card then renders the ink (which is the effect of the user's action) on a monitor or display.

One deficiency of current ink rendering techniques is the latency introduced. Pens and fingers tend to be fast and virtually instantaneous while the rendering of the ink tends to lag. In fact, the entire ink rendering process can introduce a latency that can be on the order of anywhere between 50 to 100 milliseconds or even greater. This latency in ink rendering can make for a slow and awkward user experience.

In particular, this latency is an undesirable effect in that it breaks the perceptive barrier of manipulating an object directly. Of course these are mostly perceived in situations where there is a co-located experience. In other words, when the input and the output are co-located with each other (such as writing with a stylus on a tablet computing device or a touchscreen), the latency effect is greatest.

SUMMARY

Systems and methods are provided for improving the latency for display of ink during user creation of ink content with a mouse or writing object, such as a finger, stylus, active pen, or other drawing device for tracing a desired location for ink content in a display area. In order to reduce or minimize the time for display of ink content created by a user using a stylus/mouse/touch input/other device, aspects of the technology described herein generate predictive wet ink that can be displayed with actual wet ink. The predictive wet ink is calculated by extending an active ink segment a predictive distance. The predictive distance is intended to be a distance between a termination ink point for an active wet ink segment and a tip of the writing object. In one aspect, the predictive distance is calculated by determining the current latency period on a touch device and the velocity of the writing object. The predictive distance is then the distance the writing object would travel at the velocity during the current latency period. Additionally or alternatively, the predictive distance can be calculated using both velocity and acceleration.

In addition, aspects of the technology described herein can generate pressure data for an ink rendering engine where no raw pressure data exits. Raw pressure data could be generated by a pressure sensitive touch surface, an active pen, and such. However, many devices on which users write are not pressure sensitive. Aspects of the technology described herein use writing object velocity as a proxy for pressure to generate pressure data that can be fed to the ink rendering engine. The pressure data can be used by the ink rendering engine to set an ink width and/or other ink parameters.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
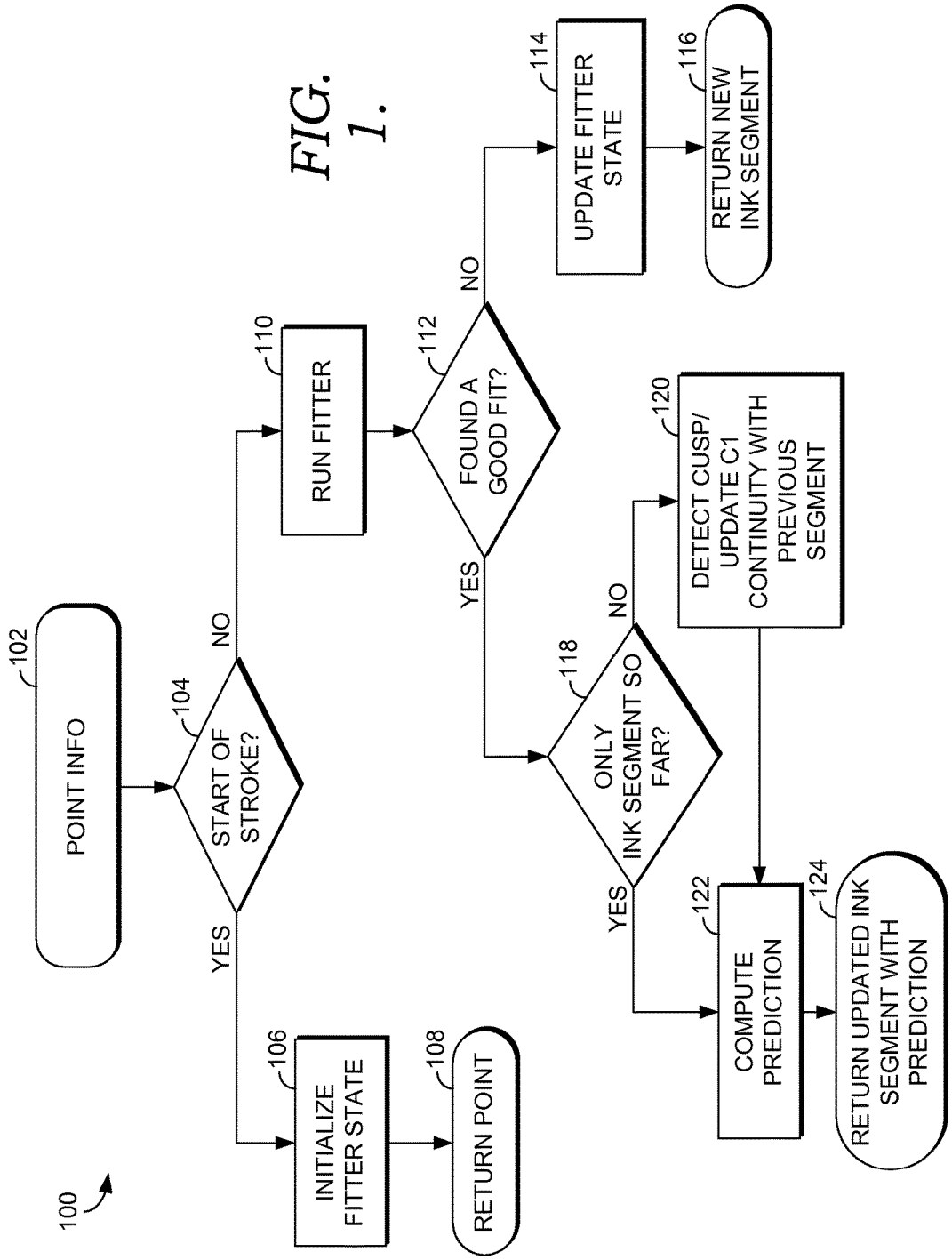
FIG. 1 schematically shows a flow diagram for generating predictive ink.

In various aspects, systems and methods are provided for reducing the display latency of ink during user creation of ink content with a stylus, mouse, finger (or other touch input), or other drawing device. In particular, a latency between the writing object contacting a touchscreen at a point and wet ink representing that point appearing on the touchscreen can be reduced by anticipating the writing object's route and rendering predictive wet ink.

"Digital ink" refers to one or more strokes that are recorded from a writing object, such as a mouse, a stylus/pen on a digitizer tablet, a capacitive stylus or capacitive object (e.g., a finger) on a capacitive touch digitizer, or a stylus/pen on a display screen integrated with a digitizer tablet that may or may not utilize a touch-sensitive display screen. As used herein, the term "ink" is used interchangeably with and refers to "digital ink." Additionally, the term "writing object" can be a pen, stylus, finger, or any other instruments that can provide a touch input. Each stroke may be stored as one or more ink points and each ink point may contain various properties including, by way of example only, pressure, tilt, azimuth, and coordinates (x, y) corresponding to a position of the input instrument. The ink point is distinguishable from the actual contact point where the writing object contacted the touch surface. For instance, a user may move a pen along a touch-sensitive display screen of a computer system so as to draw a line or curve, and the computer system may sample the coordinates (x, y) along the trajectory of the input instrument tip position over time (or on any other interval as known to those of ordinary skill in the art) as the user moves the input instrument. These coordinates represent contact points along the curve or line input by a user and are referred to herein as "contact points." The contact points can be generated by hardware components associated with a touch-interface. In general, the hardware components can assign a time stamp and location information to form the each contact point.

Written texts may convey more information than a series of coordinates connected by line segments. For example, written ink changes to reflect pen pressure (by the thickness of the ink), pen angle (by the shape of the line or curve segments and the behavior of the ink around discreet points), and the speed of the nib of the pen (by the straightness, line width, and line width changes over the course of a line or curve). Processing of these additional properties of ink may reveal emotion, personality, emphasis, and so forth in the written texts that are analyzed.

Digital ink can refer to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Digital ink may include representations of properties including pressure, angle, speed, color, stylus size, and ink opacity. Digital ink may further include other properties including the order of how ink was deposited on a page (a raster pattern of left to right then down for most western languages), a time stamp (indicating when the ink was deposited), an indication of the author of the ink, and the originating device (at least one of an identification of a machine upon which the ink was drawn or an identification of the pen used to deposit the ink) among other information.

An ink rendering engine may take the contact points as input and generate "ink points" that form ink segments. The ink rendering engine may be part of an operating system, part of an application that receives ink, or a standalone application. The ink points are used to render the digital ink, which is what a user sees displayed. The ink rendering engine may employ various smoothing algorithms and/or filters that use the contact points to form a stroke comprising a plurality of ink points that more closely resembles the appearance of a user drawing on paper. The location of individual ink points can be different from the location of individual contact points, though contact points may coincide with ink points at times.

Prior to generating ink points, the contact points can be filtered or otherwise processed to improve the performance of subsequent processes used to generate ink. In one aspect, the contact points are processed to generate a plurality of filtered-contact points. As used herein, the term "contact points" can comprise filtered contact points. Thus, when contact points are described as an input to an ink generation process or other calculation, either filtered or raw contact points can be meant. Conversely, filtered contact points do not include raw contact points.

In one aspect, a segment generator is used to form an ink segment that comprises a series of ink points calculated using a plurality of contact points, or possibly a plurality of filtered contact points. The ink segment can be rendered on the display as wet ink using the ink points in the segment along with display characteristics like ink color and width. The ink segment runs between a starting ink point and a termination ink point.

One of the difficulties with rendering ink content created by a user is displaying the ink content sufficiently quickly so that the user's actions appear to result in display of the ink content. It has been determined that users can perceive delays in responding to user actions for creation of ink content that are as small as about 50 milliseconds or less. When a delay in display of ink content being created by a user is visible as a gap between the termination ink point and the tip of a writing object, the delay can disrupt the user experience as the content creation may no longer have the sensation of creating ink using a physical pen on a writing surface.

Aspects of the technology described herein overcome this difficulty by generating predictive wet ink. The predictive wet ink is calculated by extending an active ink segment a predictive distance. The predictive distance is intended to be a distance between a termination ink point and a tip of the writing object. In one aspect, the predictive distance is calculated by determining the current latency period on a touch device and the velocity of the writing object. The predictive distance is then the distance the writing object would travel at the velocity during the current latency period.

The writing object velocity may be calculated using the time stamp on the last two contact points or could be calculated using several contact points, including all points in a current ink stroke. An ink stroke, as used herein, is the digital ink generated between a pen down event and a pen up event. A pen down event occurs when the first contact point is generated by the writing object. The pen up event corresponds with not detecting contact between the touchscreen and the writing object. In one aspect, recent contact points are given more weight than earlier contact points in the velocity calculation.

"Contact," as used herein, can mean proximity where literal contact does not occur. Some touch surfaces can sense the proximity of a writing object to the screen when the writing object is not actually contacting the touchscreen. Such proximity detection can be considered "contact" and used to generate a pen down event and "contact points."

In one aspect, writing object acceleration is also used to determine the predictive distance. The acceleration may be calculated over a series of contact points.

In some aspects, a benefit of the systems and methods described herein is improving the performance of the computer in order to reduce the apparent latency for display of ink content. Such an improvement can also lead to an improved user experience during creation of ink content.

In various aspects, the systems and methods described herein can allow a user to create ink input using an input device, such as a stylus, a touch interface for receiving touch input, a mouse, or another device that can control the movement of a cursor within a display area.

Definitions

In the discussion below, examples of the systems and methods according to the technology described herein may be exemplified using an operating environment based on a Microsoft™ operating environment, but aspects are not limited to this environment. Additionally, certain terms are used for ease of reference in describing the various aspects. The following explicit definitions are provided to aid in understanding of the various aspects.

As utilized herein, "digital ink" is a sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level.

As utilized herein, "point" is information defining a location in space. For example, the points may be defined relative to a capturing space (for example, points on a digitizer), a virtual ink space (the coordinates in a space into which captured ink is placed), and/or display space (the points or pixels of a display device).

As utilized herein, "stroke" is a sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

As utilized herein, "writing instrument" is a device for providing strokes corresponding to the digital ink. For example, the writing instruments may include pens, fingers, a stylus, and pointed objects that are capable of being sensed by the digital ink-enabled surface.

Wet Ink: Ink that is rendered while an ink stroke is in progress, that is, while the contact (pen, for example) has not yet been lifted off the surface. In various aspects, a portion on the wet ink can comprise predictive ink.

Dry Ink: Ink that is rendered or re-rendered after an ink stroke is completed or ink that is rendered from ink data loaded from a source (persisted ink content) other than input.

Predictive ink: Ink that is rendered based on a prediction of where the user intends to continue an ink stroke. The predictive ink stroke can run between a start point that corresponds to the last rendered pixel of a wet ink stroke and a termination point. The last rendered pixel of the wet ink stroke is determined based on user input on the touchscreen. The last point constantly changes as new wet ink is added to the stroke until the completion of the stroke.

Semi-dry Ink: Ink in an intermediate layer pending synchronization to the dry ink layer.

Predictive Ink Process Flow

Turning now to FIG. 1, a process flow 100 for generating predictive ink is shown, in accordance with an aspect of the technology described herein. The process flow 100 can be performed by an ink engine running on a touch sensitive device, such as a smartphone, tablet, laptop, or perceptive pixel display. The ink engine can be integrated with a device's operating system, can be a standalone application, or can be integrated with an application that receives handwritten input, such as a drawing or note taking application. At step 102, point info is received. The point info can designate a particular contact point on a touchscreen surface that has been contacted by a writing implement such as a stylus, an active pen, or a finger. The contact point can also refer to a filtered-contact point.

At decision point 104 the point information is evaluated to determine whether the point represents the start of a new ink stroke. The start of a new ink stroke may correspond with a pen down event. A pen down event can occur when a writing implement contacts the touchscreen. A point received immediately after a pen down event may be the first point in a stroke. Points received after the pen down event but before a pen up event occurs may be considered part of the same stroke. A pen up event occurs when a writing implement's contact with the touchscreen is discontinued or discontinued for greater than a threshold period of time. Phrased differently, a pen up event occurs when the touch surface stops detecting the pen contacting the touch surface or stops detecting the pen for greater than the threshold time.

If the point received at step 102 is the start of a new stroke then at step 106 a fitter is initialized. Initializing the fitter may involve initiating a new fitter process or clearing data from a running process in preparation for handling the new stroke. The fitter will be described in more detail subsequently, but in brief, the fitter generates wet ink that follows points within the stroke. Different types of fitters may be used. One type of fitter may connect the points, as in connecting the dots. A second type of fitter may attempt to draw a smoother line that tracks the contacts points, but may or may not intersect any given contact point associated with the stroke. The second type of fitter may generate a series of curved segments that together form the ink stroke.

After the fitter state has been initiated the point is returned. By returning the point, the point may be associated with a stroke and saved for subsequent processing as additional points are received. For example, the point along with other points may be processed to generate a segment of wet ink.

If the point is not the start of the stroke, as determined at decision point 104, then the fitter is run at step 110. As mentioned, the fitter takes points that have been received as part of the stroke as input and outputs data that can be used to render a segment of wet ink that follows the points.

At decision point 112, a determination is made whether or not the new point is a good fit within the active segment within the fitter. In one aspect, the fitter generates a sequence of segments. The segments may take the form of a line or curve. At some point, a new point may not fit closely with the existing segment. For example, when a user makes a sharp adjustment or change of direction in her writing then the first point received after the adjustment may not fit with the previous points. When a bad fit is detected, the fitter state is updated at step 114 to prepare generating a new segment and an existing segment is finalized at step 116. The different segments can be part of the same stroke. As mentioned, the stroke can be defined by pen down and then a pen up event.

If, at decision point 112 the new point is a good fit then at decision point 118 a determination is made whether there are multiple segments generated within the stroke. If additional segments exist, then at step 120 the relationship between the segments can be updated using the new point. The updating may be accomplished by running a C1 continuity algorithm at step 120. If there's only one segment existing at decision point 118, or after the continuity of previous segments is updated at step 120, then the predictive ink is computed at step 122. As mentioned, the predictive ink is displayed at the end of where actual wet ink terminates. As actual wet ink is generated, the predictive ink is replaced, though new predictive ink may be continuously generated until termination of the stroke at the pen up event.

The predictive ink attempts to bridge the gap between when the actual wet ink rendered on the display terminates and the tip of the writing object on the touchscreen. In one aspect, the distance between the end of the wet ink and the point of the writing object is initially determined by determining the latency within the system. The latency may be caused by delays in the hardware processing pipeline associated with the touchscreen that generates raw point data as well as a rendering pipeline that processes the raw point data to generate wet ink. In other words, the writing implement can move across the touchscreen faster than the wet ink can be generated.

Predictive Ink Examples

Figure 2:
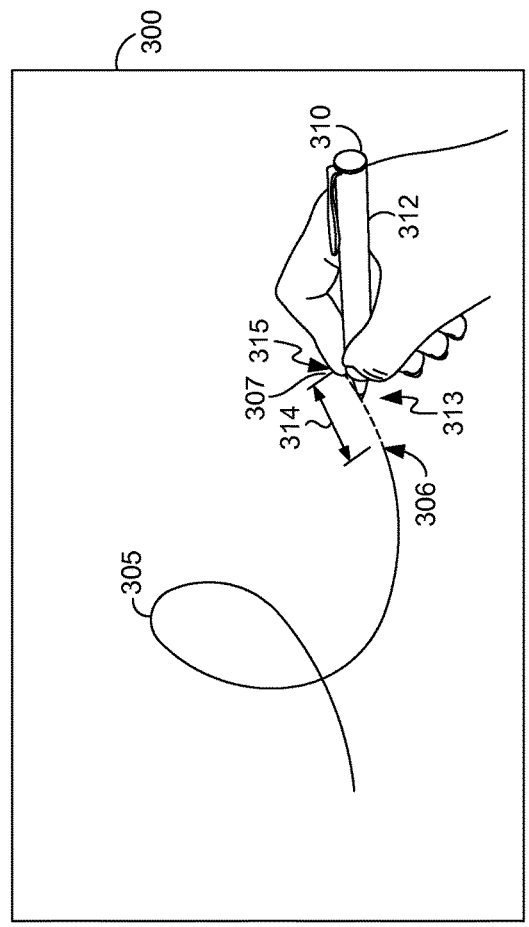
FIG. 2 is a diagram illustrating a latency affect.

Turning now to FIG. 2, a gap in the wet ink caused by latency is illustrated. FIG. 2 shows a touchscreen display 200 with an ink stroke 205 in progress. The ink stroke 205 is generated by a user's hand 210 moving a writing implement 212 across the touchscreen display. As can be seen, the wet ink in the ink stroke 205 terminates at termination ink point 206. The latency within the device and ink processing engine causes the progress of the ink to lag behind the tip 213 of the writing object. The lag causes a gap 214 between the wet ink termination point 206 and the tip 213 of the writing implement 212. In an aspect of the technology described herein, the predictive ink (not shown in FIG. 2) is generated to span the gap 214 between the wet ink termination point 206 and the tip 213 of the writing object.

Figure 3:
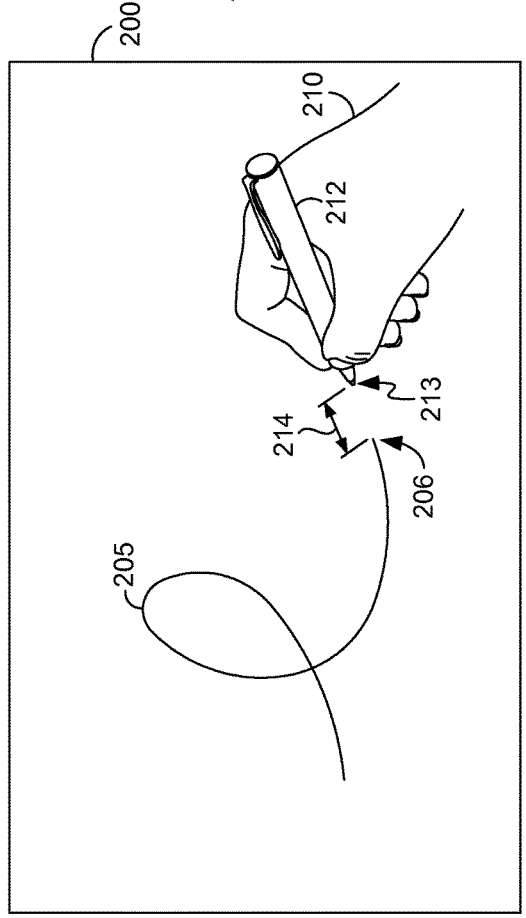
FIG. 3 is a diagram illustrating a predictive ink having an incorrect length.

Turning now to FIG. 3, an inaccurate generation of predictive ink is illustrated. Touchscreen 300 shows an active stroke 305 generated by user 310 running the tip 313 of writing implement 312 across the touchscreen 300. The wet ink terminates at ink termination point 306. In this case, predictive wet ink 315 (dashed line) has been added to the end of the actual wet ink (solid line). The length 314 of the causes the predictive wet ink 315 to exceed the distance between the ink termination point 306 of the wet ink and the tip 313 of the writing implement 312 by a noticeable amount 307. Aspects of the technology described herein attempt to avoid generating an excess of wet ink by accurately predicting the distance between the ink termination point 306 of the wet ink and the tip 313 of the writing implement 312.

Figure 4:
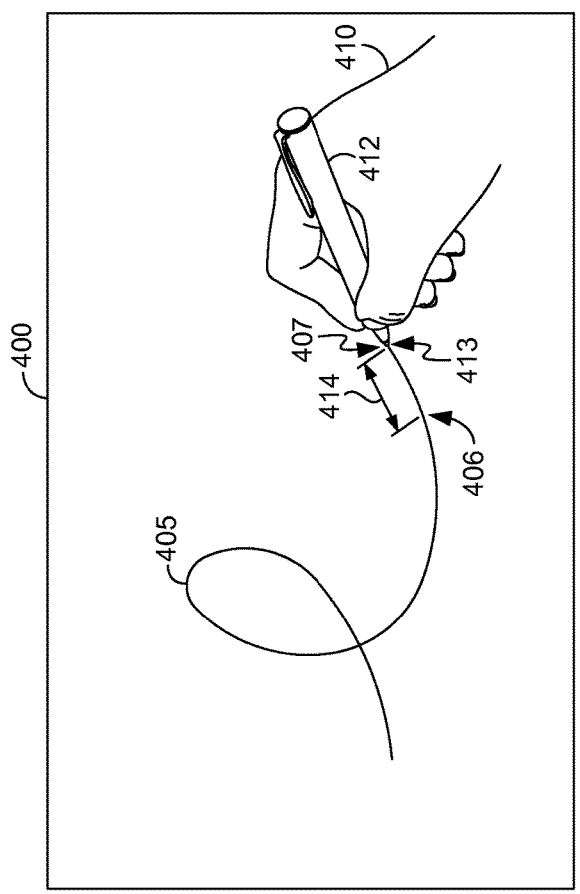
FIG. 4 is a diagram illustrating a predictive ink having a correct length.

Turning now to FIG. 4, predictive ink that is accurately sized is shown, in accordance with an aspect of the technology described herein. Touchscreen 400 shows an active ink stroke 405 generated by a user 410 running the tip 413 of the writing implement 412 across the touchscreen 400. The active stroke comprising wet ink terminates at ink termination point 406. The predictive ink starts at ink termination point 406 and runs to point 407, which corresponds on the touchscreen with tip 413. The predicative ink having a length 414 that corresponds to the difference between the ink termination point 406 of the wet ink and the tip of the writing instrument can be generated in accordance with an aspect of the technology described herein. As explained in more detail, aspects of the technology described herein seek to avoid generating predictive ink that runs in front of the writing implement or predictive ink that lags behind the writing implement exposing a gap between the ink rendered and the tip 413 of the writing object.

Figure 5:
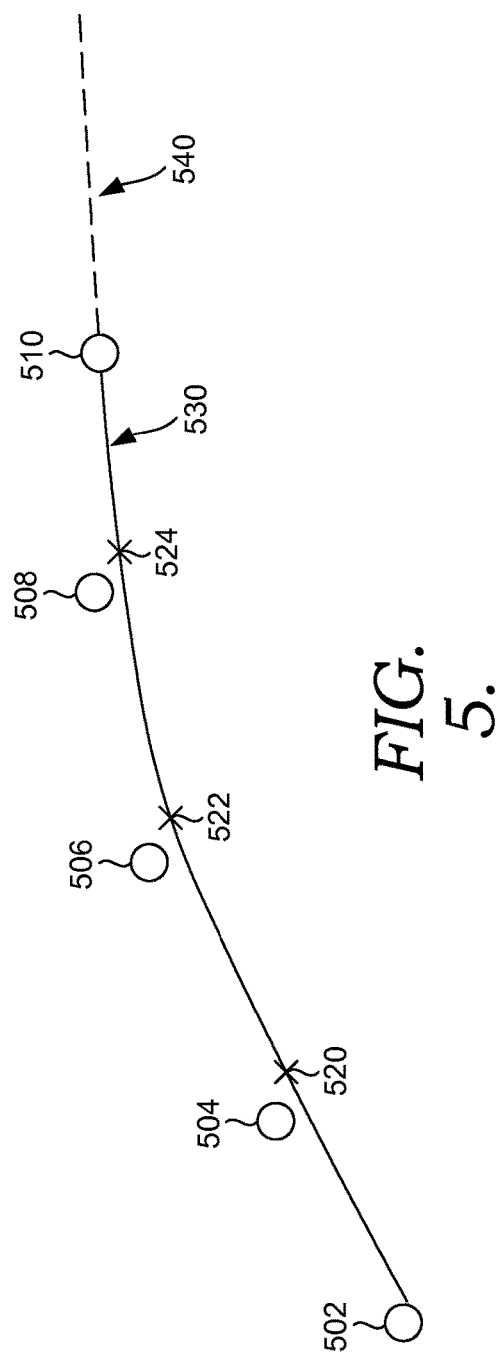
FIG. 5 is a diagram illustrating contact points, ink points, and wet ink drawn through the ink point, and predictive ink.

FIG. 5 shows exemplary contact points, wet ink points, wet ink, and predictive ink. The contact points include a first contact point 502, a second contact point 504, a third contact point 506, a penultimate contact point 508, and a terminal contact point 510. The wet ink 530 is drawn through the first contact point 502, a first wet ink point 520, a second wet ink point 522, a third wet ink point 524, and the terminal contact point 510. In aspects, the wet ink points can be calculated using a Beizer approximation. The second contact point 504, the third contact point 506, and the penultimate contact point 508 can serve as constraints in the Beizer approximation. The wet ink 540 can be calculated by re-parameterizing the Beizer approximation, using a velocity and optionally acceleration of a writing object across the surface. The wet ink 530 may form part of an ink segment.

Preliminary Filtering

As mentioned, aspects of the technology described herein may filter contact points to generate a set of filtered contact points. In scenarios where contact points have a lot of noise or are not very good quality, the output of the fitting algorithm may not look "smooth" due to few points being fit per segment. Since, in one aspect, input points are not more than 10 himetric units away from the fitted curve, jittery data may exceed this limit more often. The resulting Bézier curves will still fit the input points but will most likely not look like what the user intended since error is introduced by the hardware. While the fit error tolerance can be increased to reduce the effect of jitter, this produces an undesirable effect of a noticeable ink shape changing while inking. Instead of increasing the fit error tolerance, one way to mitigate this problem is to preprocess input points by passing the points through a filter before running the fitting algorithm. A disadvantage of filtering input is the increase in latency. The latency caused by filtering can be included in the latency used to determine a length of the predictive ink.

Several different filtering methods are possible. A first method of filtering noise is to take a moving average of the input points. One example is a 3-point average, where each input point is averaged with the previous and successive point. Specifically, given input points $\{p_0, \ldots, p_{n-1}\}$, the resulting points $\{\tilde{p}_0, \ldots, \tilde{p}_{n-1}\}$ would be:

$$\tilde{p}_0 = p_0$$
$$\tilde{p}_i = \frac{p_{i-1} + p_i + p_{i+1}}{3} \quad 0 < i < n-1$$
$$\tilde{p}_{n-1} = p_{n-1}$$

Note that a point cannot be computed until the next point is known, which increases latency by the time it takes to receive the next input point. This can be extended to include more points in the average. For example, a 5-point average would take the average of 5 consecutive points.

An EAn infinite impulse response (IIR) filter is a second filter that can be used with aspects of the technology described herein. IIR is like a moving average where the resulting value depends on all previous values. With an exponential IIR filter, the weights of previous points decrease exponentially. The current smoothed point $\tilde{p}$ is computed by taking a weighted average of the current input point p and the previous smoothed point $\tilde{p}_{prev}$:

$$\tilde{p} = a \cdot p + (1-a) \cdot \tilde{p}_{prev} \quad 0 \leq a \leq 1$$

a is a parameter that determines the weight of the current input point and the previous smoothed point.

Notice that applying an exponential filter has a similar effect to the moving average where filtered points tend towards the inside of a curve. Also, when more weight is placed on the previous point (that is, when a is smaller), the resulting point lags behind the actual input point more. The resulting endpoint of a stroke is also visibly behind the last actual input point. This is different from the moving average, where the last input point is defined to be the last point of the resulting stroke.

Note that it is possible to vary a based on current velocity or other factors. For example, a may be larger for higher velocities so that the smoothed point doesn't fall too far behind and there is less perceived latency. Note that velocity calculation requires knowing the timestamps of input points. Accordingly, raw contact points may be used to determine velocity. In another aspect, the filtered contact points include the same time-stamp info as the corresponding raw contact point.

Ink Fitter

As mentioned a fitter, such as the fitter mentioned with reference to FIG. 1, receives contact points as input and generates ink points that are used to form both wet and dry ink. In one aspect, a cubic Bézier fitter generates cubic Bézier segments. The fitting algorithm approximates a stroke of ink points with a set of cubic Bézier segments. A Bézier segment is a curve generated using a Bézier algorithm. Either end of the Bézier segment is on a contact point. The contact points between the end points can be control points for the Bézier algorithm. The contact points may not be on the curve generated by the Bézier algorithm. As the algorithm is fed one contact point at a time, for each new point it either updates the active Bézier segment, or it starts a new one if the point cannot be fit well enough with the active segment. The fit can be evaluated using segmentation logic.

The Cubic Bézier Fitter maintains a set of active points. Each time a new point is received, it is added to the set and the Fitter computes a new cubic Bézier approximation. The cubic Bézier approximation continues to update until a point is received that does not fit with the others causing the active segments to be finalized and a new segment to be started. A single stroke can include multiple segments. The segments are connected and the end of a first segment is the beginning of the next segment. In other words, adjacent segments share a contact point. Thus, the active set does not necessarily contain all the points since the beginning of the stroke as it may be reset by the Segmentation Logic. A cubic Bézier segment B(t) is defined by its four control points $C_0, C_1, C_2, C_3$:

$$B(t)=(1-t)^3 C_0 + 3(1-t)^2 t C_1 + 3(1-t) t^2 C_2 + t^3 C_3, \quad t \in [0,1]$$

At any given point in time the algorithm fits a set $S\_k = \{p\_0, p\_1, \ldots, p\_(k-1)\}$ of active points with one single Bézier segment, B(t). The fitting task is formulated as a minimization problem:

$$B^*(t) = \mathrm{argmin}_B E,$$

Where E is some error function that described more fully below.

Let P(t), $t \in [0,1]$ be the implicit polyline described be the set $S_k$. Then, $$P(0) = p_0$$

$$P(1) = p_{k-1}$$

Since it is expensive to compute the distance between a point on the polyline and the Bézier, in various aspects, the distance between the two points obtained by sampling the polyline and the Bézier at the same value of the parameter t is approximated:

$$d(t) = \|B(t) - P(t)\| = \sqrt{(B_x(t) - P_x(t))^2 + (B_y(t) - P_y(t))^2}, \quad t \in [0,1]$$

The error function for which minimization is desired may then be defined as:

$$E = E_N = \frac{1}{N} \cdot \sum_{i=0}^{N-1} d^2(t_i),$$

$$t_i \in [0,1]$$

N=k and $t_i$ are can be selected such that $P(t_i)=p_i$, i=0, 1, ..., k-1 so that the error function accounts for all and only the points in $S_k$. However, since a cubic approximation is being use, the sample includes at least four points.

The variables of the minimization problem are B's control points. Let $C=[C_0, C_1, C_2, C_3]$ be the vector of control points. A gradient descent approach is used to find optimal values:

$$C^{j+1} = C^j - \alpha \cdot \nabla_{C^j}(E_N), \quad 0 < \alpha \leq 1$$

The parameter α of the update rule controls the convergence rate. In general, less iteration is required with bigger values but at the same time the calculations may become unstable when α is big. One exemplary parameter α that may be utilized is:

$$\alpha^{j+1} = \frac{\mathrm{average\_error}}{\max_i \nabla_{C_i^j}(E_N)}$$

Furthermore, the risk of divergence may be mitigated by dividing a by the number of iterations that did not produce any improvements on the fitting error.

$\nabla_{C^j}(E_N)$ is the gradient of the approximation error with respect to B's control points and may be computed as follows:

$$\nabla_C(E_N) = \frac{2}{N} \cdot \sum_{i=0}^{N-1} d(t_i) \cdot \nabla_C d(t_i) = \frac{2}{N} \cdot \sum_{i=0}^{N-1} d(t_i) \cdot \nabla_B^T d(t_i) \cdot \nabla_C B(t_i) =$$

$$\frac{2}{N} \cdot \sum_{i=0}^{N-1} d(t_i) \cdot \nabla_B^T \left( \sqrt{(B_x(t_i) - P_x(t_i))^2 + (B_y(t_i) - P_y(t_i))^2} \right) \cdot \nabla_C B(t_i) =$$

$$\frac{2}{N} \cdot \sum_{i=0}^{N-1} \sqrt{(B_x(t_i) - P_x(t_i))^2 + (B_y(t_i) - P_y(t_i))^2} \cdot$$

$$\frac{\nabla_B^T ((B_x(t_i) - P_x(t_i))^2 + (B_y(t_i) - P_y(t_i))^2)}{2 \cdot \sqrt{(B_x(t_i) - P_x(t_i))^2 + (B_y(t_i) - P_y(t_i))^2}} \cdot \nabla_C B(t_i) =$$

$$\frac{1}{N} \cdot \sum_{i=0}^{N-1} \nabla_B^T ((B_x(t_i) - P_x(t_i))^2 + (B_y(t_i) - P_y(t_i))^2) \cdot \nabla_C B(t_i) =$$

$$\frac{2}{N} \cdot \sum_{i=0}^{N-1} \begin{bmatrix} B_x(t_i) - P_x(t_i) \\ B_y(t_i) - P_y(t_i) \end{bmatrix} \cdot$$

$$[(1-t_i)^3 \quad 3 \cdot (1-t_i)^2 \cdot t \quad 3 \cdot (1-t_i) \cdot t_i^2 \quad t_i^3]$$

It should be noted that there are four degrees of freedom in the update rule, corresponding to the four control points of a cubic Bézier approximation. However, the segmentation component 230 described in the next section will use some of these degrees of freedom to impose desirable analytic properties (e.g., continuity) on the spline.

Segmentation

The segmentation logic accomplishes two base tasks. First, it decides whether to start a new Bézier approximation or update the current one. Second, it enforces analytic properties on the spline (most notably C0 or C1 continuity) by re-configuring the cubic Bézier fitter any time a new approximation or curve is started. As utilized herein, and as will be understood by those of ordinary skill in the art, "continuity" refers to the relative smoothness at the joints at which adjacent Bézier curves connect. "C0 continuity" refers to situations where adjacent Bézier curves share the same endpoints. "C1 continuity" refers to situations where adjacent Bézier curves share both the same endpoints and the same derivatives.

The decision whether to start a new Bézier approximation or update the current one is based on the quality of the fit. More specifically, the decision whether to start a new Bézier approximation or update the current one is based on the maximum distance between the digitized ink points received and the best approximation computed by the cubic Bézier fitter. In aspects, the cutoff threshold may be 10 himetric units (0.1 mm), a point above which users in a usability study indicated that ink changes as new points arrive (other than extending to the new point) were noticeable. It should be noted, however, that the threshold correlates with the physical size of the ink as it is being rendered. For example, if the wet ink (that is, ink rendered during stroke activity, before the input instrument is released from the receiving surface) is being rendered with 10× magnification, then the threshold likely would need to be 10 times smaller or the user will notice ink changes. Of course, since dry ink (i.e., the ink on the receiving surface once the input instrument is released therefrom) does not change (that is, the segmentation is already done) this point is meaningful only for wet ink. It should be further noted that the threshold may be a function of any quantity of previous ink points, any features of such ink points (e.g., coordinates, pressure, tilt, twist, etc.), and/or may be device dependent (e.g., DPI, available memory, CPU, GPU, and the like). Any and all such variations, and any combination thereof, are contemplated to be within the scope of the technology described herein.

The other important task accomplished by the segmentation logic is to impose desirable analytic properties on the spline. At very least the spline must be connected (C0 continuity), which means that the first control point of each Bézier curve or segment must match with the last control point of the previous curve or segment thereby losing one degree of freedom:

C0 Continuity: $C_{s-1,3} = C_{s,0}$

While C0 continuity guarantees that the spline is connected, it is not enough to produce smooth ink. In accordance with aspects of the technology described herein, the bad artifacts may be removed by imposing C1 continuity. Parametric C1 continuity requires that the derivative of a segment at t=0 match that of the previous segment at t=1:

$B_s'(0) = B_{s-1}'(1) \Rightarrow C_{s,1} - C_{s,0} = C_{s-1,3} - C_{s-1,2}$

However, another degree of freedom is lost when parametric C1 continuity is imposed which leaves little freedom for producing good fits. Fortunately, all that is needed for the spline to look smooth is geometric (as opposed to parametric) C1 continuity which is less restrictive and requires to constrain only the direction of the second control point:

Geometric C1 Continuity: $C_{s,1} - C_{s,0} = \beta(C_{s-1,3} - C_{s-1,2})$, $\beta > 0$ In accordance with embodiments hereof, geometric C1 continuity may be imposed by projecting the second control point on the required direction, after the update rule has been applied.

Predictive Ink Calculation

Figure 6:
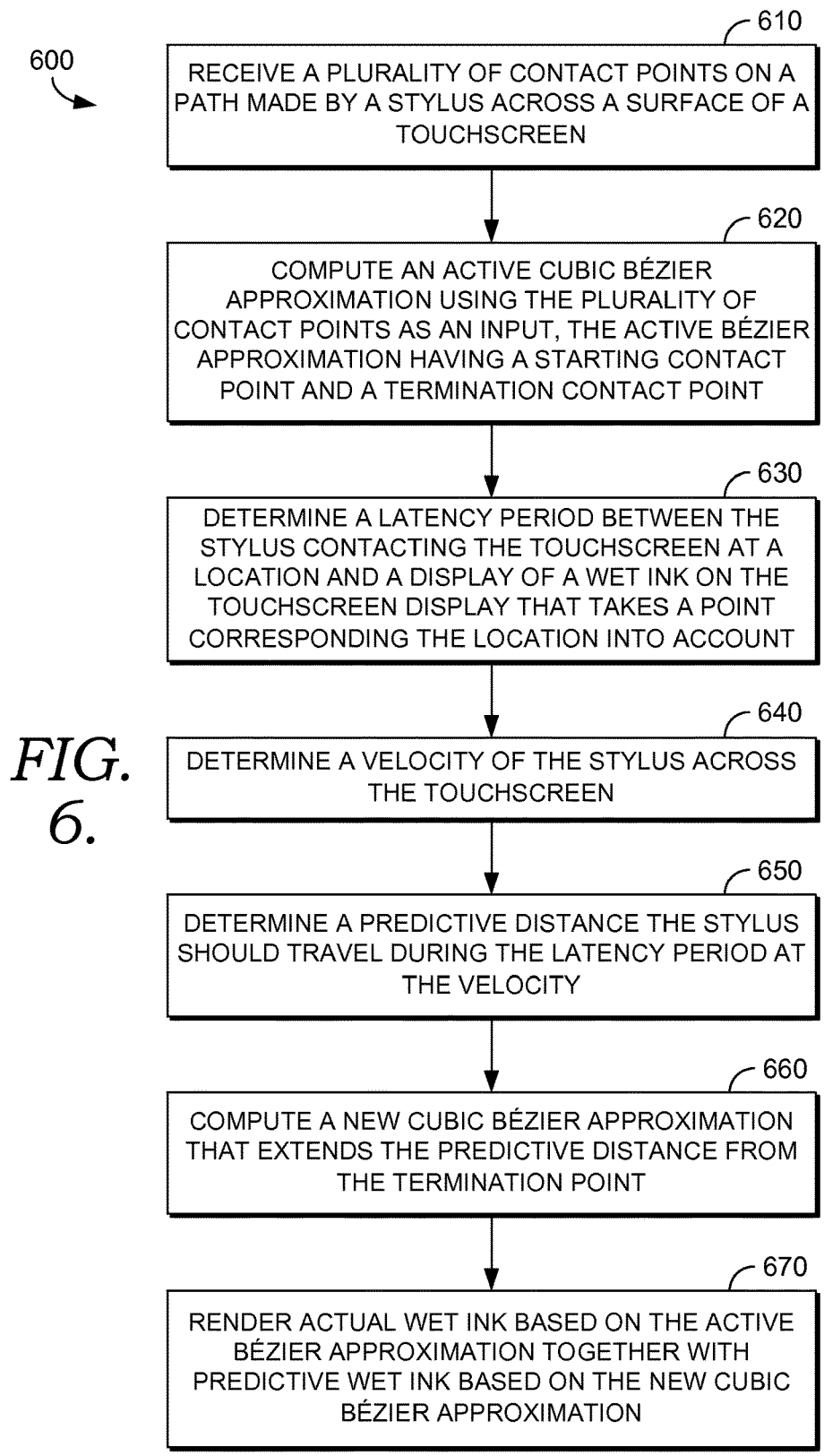
FIG. 6 is a diagram of a flow chart of a method for generating predictive ink, according to an aspect of the technology described herein.

Turning now to FIG. 6, a flow chart showing a method 600 for rendering predictive wet ink content on a display device is provided, in accordance with an aspect of the technology described herein. At step 610, a plurality of contact points on a path made by a writing object across a surface of a touchscreen is received.

At step 620, an active cubic Bézier approximation is computed using the plurality of contact points as an input. The active Bézier approximation has a starting contact point and a termination contact point. The generation of a Bézier approximation has been described above.

At step 630, a latency period between the writing object contacting the touchscreen at a location and a display of a wet ink on the touchscreen display that takes a point corresponding the location into account is determined. In one aspect, the latency period is determined to be 20 ms of greater, such as 30 ms or greater, or such as 40 ms or greater, or such as 50 ms or greater, or such as 60 ms or greater, or such as 80 ms or greater, or such as 100 ms or greater. In one aspect, the latency is determined by calling a function that calculates the latency. The function can be called through an operating system API or other mechanism. The latency may alternatively be described as the draw time (i.e., the time is takes for a drawn point to appear on the screen.)

At step 640, a velocity of the writing object across the touchscreen is determined. The velocity may be determined using the distance between contact points that are part of the wet ink and the distance between those points. Optionally, acceleration can also be determined. In one aspect, the velocity is calculated over the two most recently received contact points for the wet ink. In another aspect, all contact points in the active stroke are considered and more recent points are given more weight. Acceleration can also be calculated over the most recent three or more points or using additional points with the more recent points given more weight.

At step 650, a predictive distance the writing object should travel during the latency period at the velocity is determined. This calculation is described in more detail below.

At step 660, a new cubic Bézier approximation that extends the predictive distance from the termination point is calculated.

At step 670, the actual wet ink based on the active Bézier approximation is rendered together with predictive wet ink based on the new cubic Bézier approximation.

Figure 7:
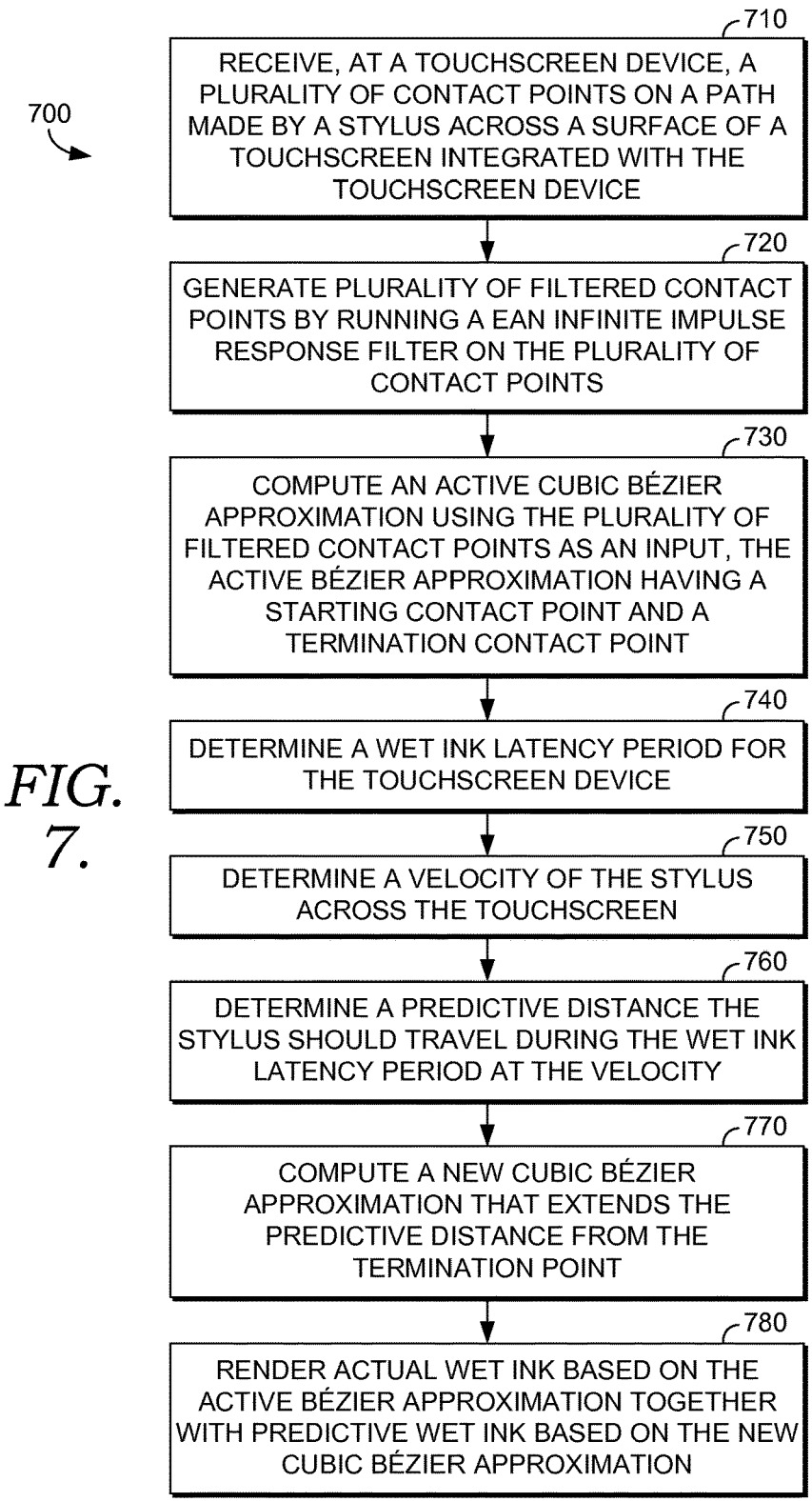
FIG. 7 is a diagram of a flow chart of a method for generating predictive ink, according to an aspect of the technology described herein.

Turning now to FIG. 7, a method 700 for assigning pressure data to contact points is provided, in accordance with an aspect of the technology described herein. At step 710, a plurality of contact points are received at a touchscreen device. The contact points are on a path made by a writing object across a surface of a touchscreen integrated with the touchscreen device.

At step 720, a plurality of filtered contact points are generated. In one aspect, the filtered points are generated by running an EAn infinite impulse response filter on the plurality of contact points. Other filtering methods are possible.

At step 730, an active cubic Bézier approximation is computed using the plurality of filtered contact points as an input. The active cubic Bézier approximation having a starting contact point and a termination contact point.

At step 740, a wet ink latency period for the touchscreen device is determined.

At step 750, a velocity of the writing object across the touchscreen is determined.

At step 760, a predictive distance the writing object should travel during the wet ink latency period at the velocity is determined. Acceleration can also be considered when calculating the predictive distance.

At step 770, a new cubic Bézier approximation that extends the predictive distance from the termination point is computed. The new cubic Bézier approximation can be calculated as described previously.

At step 780, wet ink based on the active Bézier approximation is rendered together with predictive wet ink based on the new cubic Bézier approximation. The predictive wet ink can extend from the termination of the wet ink. As additional wet ink is rendered the additional wet ink can replace the predictive wet ink.

Various aspects of method 600 and 700 are now described in more detail below.

To generate the predictive ink, the amount by which the current Bézier segment is to be extended is calculated. Let $\tilde{p}_0, \ldots, \tilde{p}_{n-1}$ be the (filtered) positions of the contact points of the current stroke (ordered by time), $\tilde{T}_0, \ldots, \tilde{T}_{n-1}$ be the corresponding (filtered) timestamps of the points, and T the specified time ahead to predict. In one aspect, the time ahead T=the wet ink latency. The wet ink latency is the amount of time between a writing object contacting a point on the touchscreen and wet ink generated using the contact point is displayed.

Once the wet ink latency is determined, the velocity of the writing implement can be calculated to determine a distance that a predictive ink should extend from the end of the actual wet ink. In one aspect, the acceleration of the writing implement is considered in conjunction with the writing implement's velocity to calculate the predictive ink distance. The predictive ink is then generated by extending a segment through re-parameterization.

Note that the contact point data can be preprocessed with a filter to remove noise and jitter as described previously. Filtering timestamps also avoids the problem of duplicate timestamps that would cause a division by zero in the following computation. In the case when there are at least 3 input points being fit by the current Bézier segment, the length of the extended Bézier segment is computed by calculating a velocity $v_0$ between points n−1 and n−2 and $v_1$ between points n−2 and n−3 as follows:

$$v_0 = \frac{\|\tilde{p}_{n-1} - \tilde{p}_{n-2}\|}{\tilde{T}_{n-2} - \tilde{T}_{n-2}}$$

$$v_1 = \frac{\|\tilde{p}_{n-2} - \tilde{p}_{n-3}\|}{\tilde{T}_{n-2} - \tilde{T}_{n-3}}$$

$$a = \frac{v_0 - v_1}{\tilde{T}_{n-1} - \tilde{T}_{n-2}}$$

a is the acceleration of the writing object. If a<0, set $$T := \min\left\{T, \frac{v_0}{-a}\right\}$$

since predicted velocity may be negative.

After computing the arc length of the current segment, the segment is reparameterized using the parameter t that corresponds to the arc length plus $$v_0 T + \frac{aT^2}{2},$$

which is the amount being extended that corresponds to T. The basic idea is to do prediction by extending the last Bézier segment B(t) to its future which means sampling B(t) at t.

Pressure Simulation

In addition, aspects of the technology described herein can generate pressure data for an ink rendering engine where no raw pressure data exits. Raw pressure data could be generated by a pressure sensitive touch surface, an active pen, or such. However, many devices on which users write are not pressure sensitive. Aspects of the technology described herein can use writing object velocity as a proxy for pressure to generate pressure data that can be fed to the ink rendering engine. The pressure data can be used by the ink rendering engine to set an ink width and/or other ink parameters.

Figure 8:
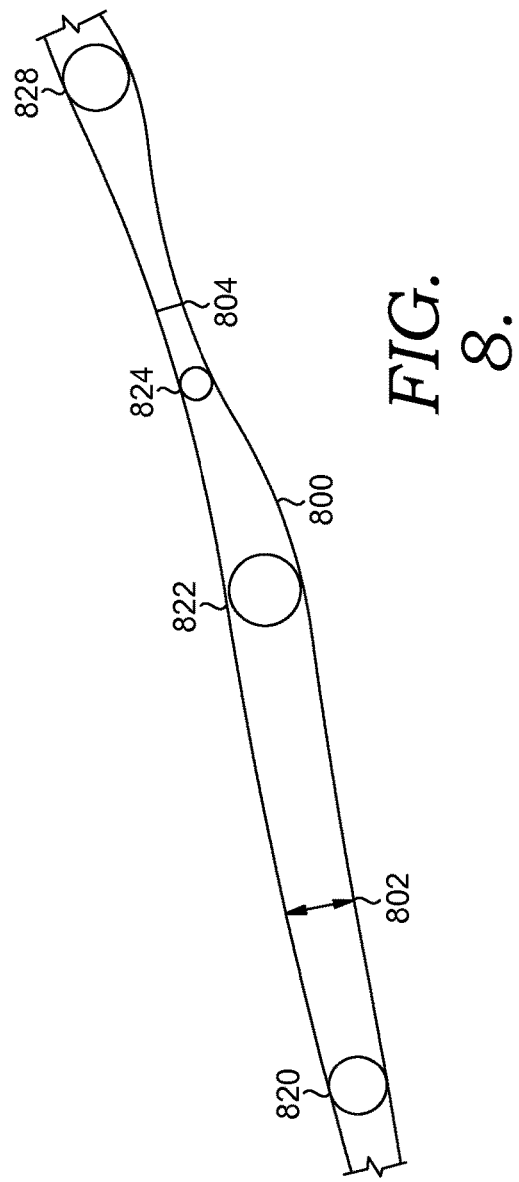
FIG. 8 is a diagram illustrating ink thickness.

In an aspect of the technology described herein, pen velocity is used as a proxy for pen pressure that is, in turn, used to set the thickness of the resulting ink. As used herein, thickness of ink refers to the cross-sectional width of the ink, with the cross section taken approximately perpendicular to the ink stroke. FIG. 8 illustrates ink 800 having different thicknesses at different sections. The ink runs through ink point 820, ink point 822, ink point 824, and link point 828. In one aspect, the different ink points are associated with different pressure values. The higher pressure can create a thicker ink, such as at the first cross section 802. A lower pressure can create a thinner line, such as at the second cross section 804.

In general, a higher velocity serves as a proxy for light pressure, which results in thinner ink. And a lower velocity serves as a proxy for high pressure, which results in thicker ink.

Figure 9:
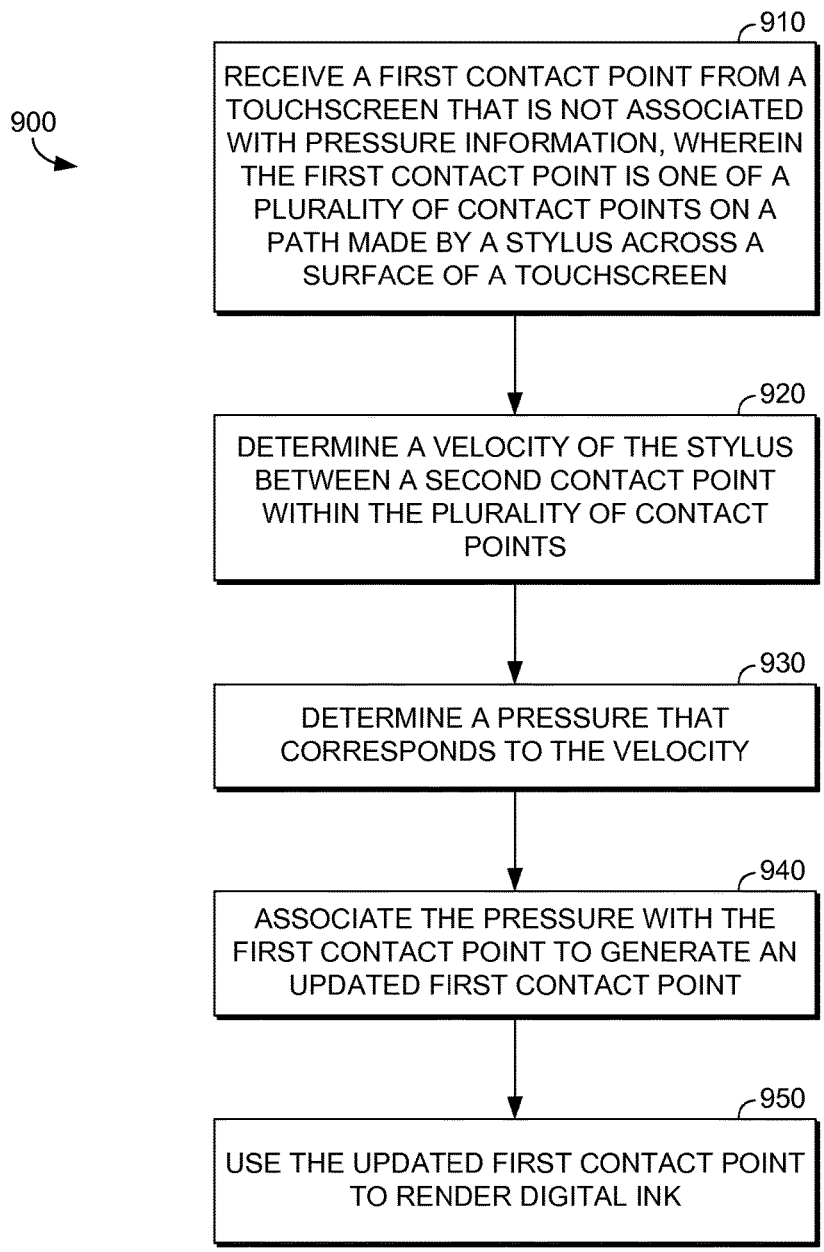
FIG. 9 is a diagram of a flow chart of a method for generating pressure data for use generating digital ink, according to an aspect of the technology described herein.

Turning now to FIG. 9, a method 900 for assigning pressure data to contact points is provided, in accordance with an aspect of the technology described herein.

At step 910, a first contact point from a touchscreen that is not associated with pressure information is received. The first contact point is one of a plurality of contact points on a path made by a writing object across a surface of a touchscreen.

At step 920, a velocity of the writing object between a second contact point within the plurality of contact points is determined.

At step 920, a pressure that corresponds to the velocity is determined.

At step 930, the pressure is associated with the first contact point to generate an updated first contact point.

At step 940, the updated first contact point is used to render digital ink. The first contact point could be communicated to a ink rendering engine that renders the digital ink.

Details of method 900 are now provided. Aspects of the technology described herein can use velocity as a proxy for pressure when a device or devices used to create the ink are not able to effectively process input pressure. As a threshold step, aspects the technology described herein may determine that a device is not providing pressure data in association with contact points or through a different channel. Some devices are not able to associate pressure data with contact points. In this case, the inability of detect pressure could be caused by the hardware, the software on the hardware, or a combination.

There has been effort to leverage the active pen technology to get natural and beautiful ink through the use of pen tip pressure captured in the pointer info. It can be associated with the width of the ink stroke so it becomes thicker when pressure is high and thinner when pressure is low. It is a natural analogy of what a writer produces from the physical inking on paper as well. However, this model doesn't directly apply to touch inking or passive pen (stylus) inking since there is no pressure information provided from the hardware. When pressure data is not present, then the ink strokes will always have the same width regardless of the user's writing style and appear to be quite dull.

To improve the touch ink quality to be on par with what can be produced by an active pen, aspects of the technology described herein use an algorithm that simulates pen tip pressure with the velocity of writing object's move during the inking. The basic assumption is that slow and persistent writing will create thicker strokes and fast and prompt inking likely creates thinner strokes. Aspects of the technology described herein capture a user's intention through the velocity change and reflect it in the stroke appearance.

The velocity could be computed by dividing the distance (in DIPs) between two consecutive ink points by the sampling time, e.g. 16 ms on a 60 hz digitizer. A simulation function is then needed to map velocity to pressure so it can be used in similar computations as stroke width is derived for active pen. One method is to get the vector of velocity in the XY coordinates. Then the logarithm of the vector's absolute value is computed and mapped to pressure.

$$P=|\log(\sqrt{V_x^2+V_y^2})|$$

This pressure P can then be associated with a contact point(s) associated with the velocity vector. Note that given the same velocity, log can be replaced with larger bases, such as $\log_5$ or $\log_{10}$, to get thicker strokes for a different inking experience.

Digital Ink Environment

Figure 10:
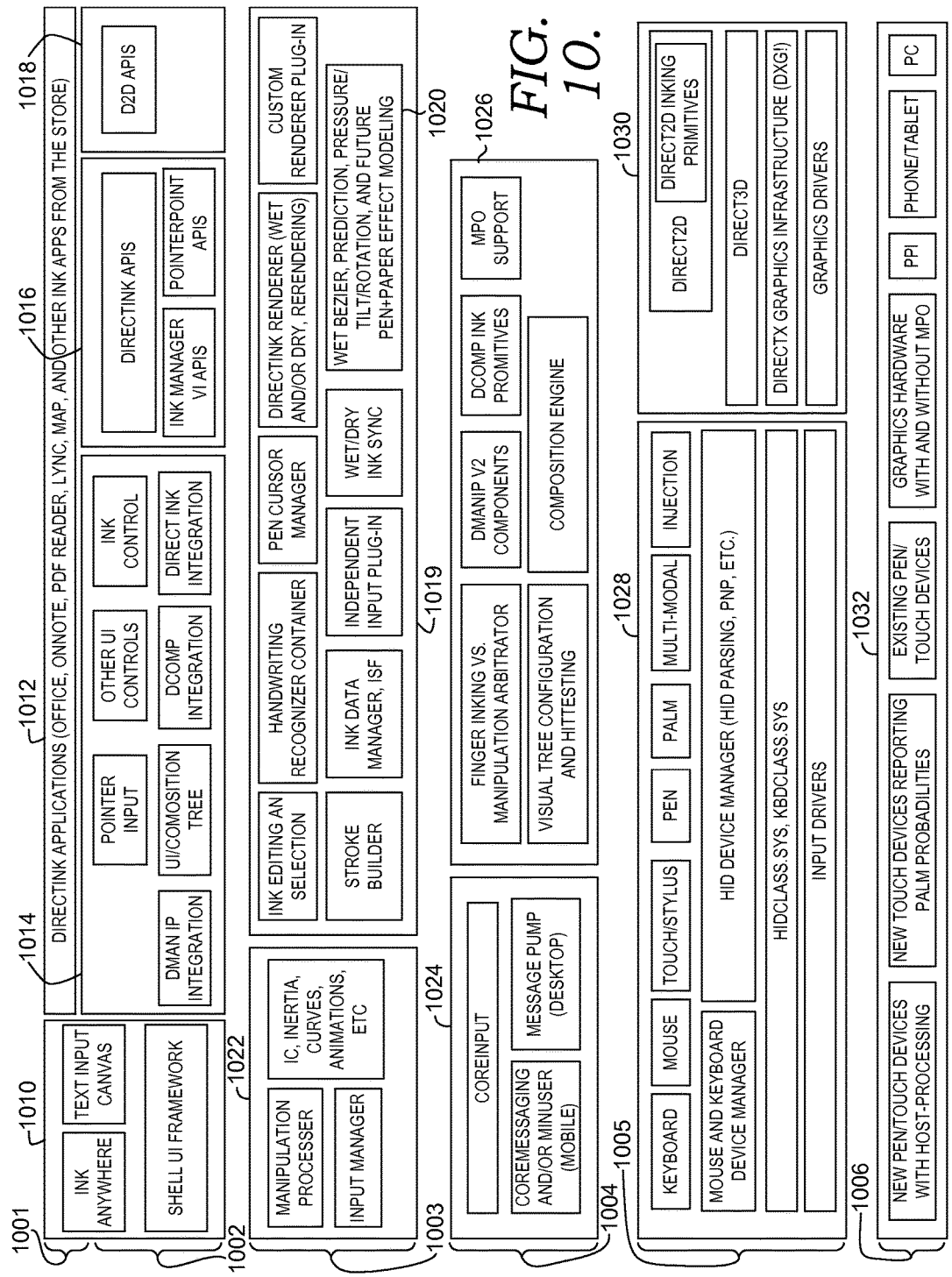
FIG. 10 is a diagram of a digital ink environment, according to an aspect of the technology described herein.

FIG. 10 shows an exemplary digital ink environment 1000 suitable to practice aspects of the technology described herein. The digital ink environment 1000 may be present on a tablet, PC, laptop, smartphone, or other computing device, such as computing device 1100 described subsequently. The digital ink environment 1000 is based on and uses terminology from a Microsoft™ operating environment. Aspects of the technology described herein are not limited to this environment.

FIG. 10 shows the latency that can be generated at different aspects of the environment. For example, the hardware ecosystem 1006 can generate 15 ms to process the input (e.g. generate contact point data) and 24 ms to render the ink. The low level input and graphics layer 1005 can add another 1 ms. The input and compositor layer 1004 can generate 24 ms. These numbers can vary from device to device and are just provided here as an example. Other aspects of the ink rendering process, not shown, may generate latency. Given these numbers the total latency would be 64 ms. In aspects of the technology described herein, the predictor component 1020 can draw predictive wet ink 64 ms into the future using a given velocity and Beizer approximation.

Other layers in the digital ink environment 1000 include the application and shell layer 1001, the UI framework layer 1002, and the DirectInk layer 1003. The application and shell layer 1001 includes the shell subcomponents 1010 and direct ink applications 1012. The direct ink application installed on any given device can vary. The UI framework layer 1002 includes the UI Framework subcomponents 1014, the Ink application program interfaces (APIs) 1016, and the DirectX APIs 1018. The directInk layer 1003 includes the direct manipulation subcomponents 1022 and the DirectInk subcomponents 1019. The Input and Compositor layer includes the input subcomponents 1024 and the compositor subcomponents 1026. The low-level input and graphics layer includes low-level input subcomponents 1028 and graphics subcomponents 1030. The hardware ecosystem 1006 can include hardware subcomponents 1032, including various hardware drivers related to touch functionality.

Computing Environment

Figure 11:
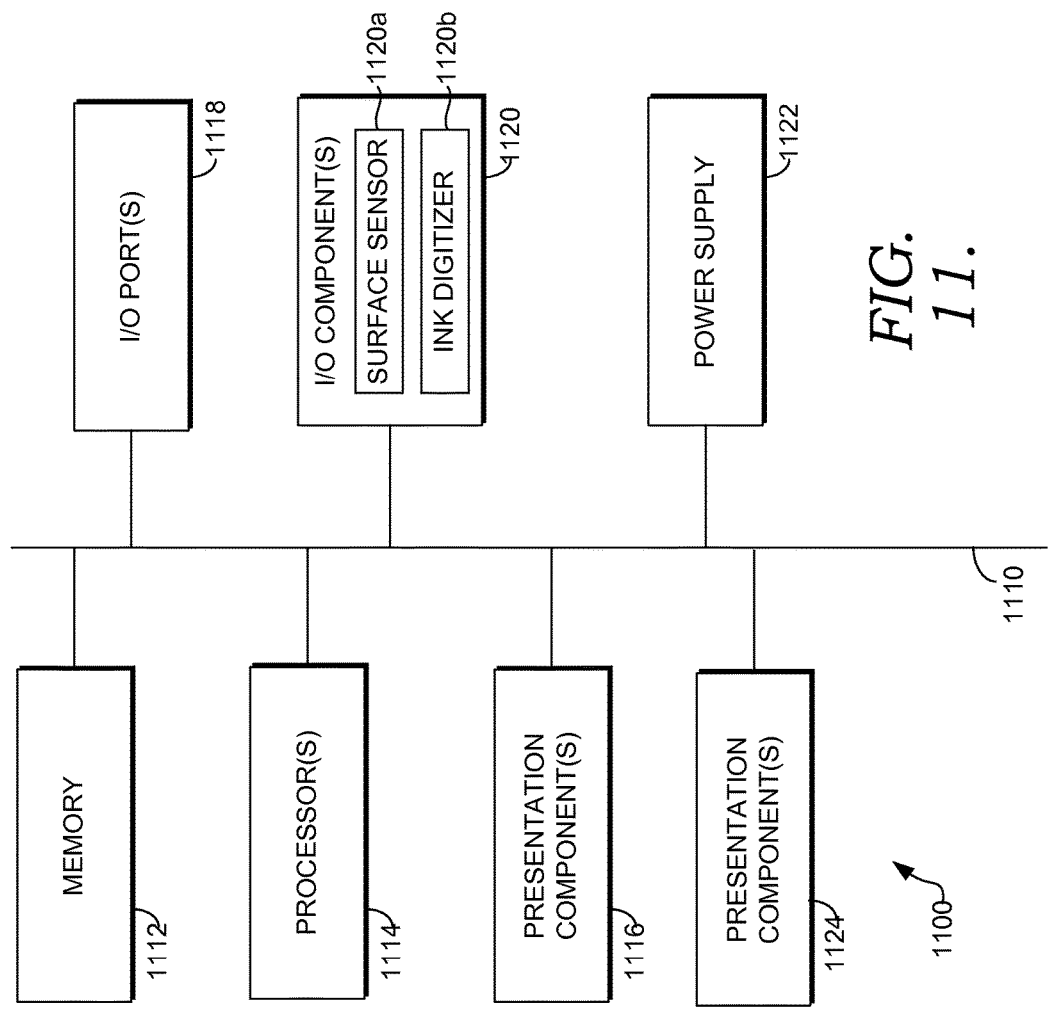
FIG. 11 is a diagram of an exemplary computing environment, according to an aspect of the technology described herein.

FIG. 11 is a block diagram illustrating an exemplary computing environment suitable for implementing embodiments of the technology described herein. Referring to the figures in general and initially to FIG. 11 in particular and computing device 1100 that is configured to selected digital ink rendered by the computing device 1100. The computing device 1100 is but one example of a suitable computing environment and is not intended to suggest any limitation as to the scope of use or functionality of embodiments of the technology described herein. Neither should the computing device 1100 be interpreted as having any dependency or requirement relating to any one component, or combination of components, illustrated.

The embodiments of the technology described herein may be described in the general context of computer code or machine-useable instructions, including computer-executable instructions. These instructions may include program components being executed by a computer or other machine (e.g., a personal data assistant or other handheld device). Generally, program components, including routines, programs, applications, objects, components, data structures, and the like, refer to code that performs particular tasks or implements particular abstract data types. Embodiments of the technology described herein may be practiced in a variety of system configurations, including handheld devices, tablet computers, gaming devices, consumer electronics, general-purpose computers, specialty computing devices, etc. Embodiments of the technology described herein may also be practiced in distributed computing environments or cloud environments, where tasks are performed by remote-processing devices that are linked through a communications network.

As one skilled in the art will appreciate, the computing device 1100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application-specific integrated circuit (ASIC), system-on-a-chip (SOC), or complex programmable logic devices (CPLDs). The hardware logic allows a computing device to generate a graphical user interface that receives digital ink strokes from a user. The device is configured to receive digital ink strokes as input at the graphical user interface. In certain embodiments, the computing device switches between digital ink writing modes and digital ink selection modes. Based on action received from the user, the computing device may select digital ink strokes rendered on an ink-enabled surface. The device may, in an embodiment, display a command box to modify the digital ink strokes.

With continued reference to FIG. 11, computing device 1100 includes a bus 1110 that directly or indirectly couples the following devices: memory 1112, one or more processors 1114, one or more presentation components 1116, input/output (I/O) ports 1118, I/O components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 11 is merely illustrative of an exemplary computing device that can be used in connection with one or more embodiments of the technology described herein. Distinction is not made between such categories as "workstation," "server," "laptop," "handheld device," etc., as all are contemplated within the scope of FIG. 1 and refer to "computer" or "computing device."

Computing device 1100 typically includes a variety of computer-readable media. Computer-readable media can be any available media that is accessible by computing device 1100 and includes both volatile and nonvolatile media, removable and non-removable media. Computer-readable media may comprise computer storage media and communication media.

Computer storage media includes volatile and nonvolatile, removable and non-removable media implemented in any method or technology for storage of information, such as computer-readable instructions, data structures, program modules, or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVDs) or other holographic memory, magnetic cassettes, magnetic tape, magnetic disk storage or other magnetic storage devices, or any other medium that can be used to encode desired data and that can be accessed by the computing device 1100. In an embodiment, the computer storage media can be selected from tangible computer storage media like flash memory. These memory technologies can store data momentarily, temporarily, or permanently. Computer storage does not include, and excludes, communication media. Computer storage media is non-transitory and excludes propagated data signals.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared and other wireless media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components 1116 include a display device, a digital ink-enabled surface, a speaker, a printing component, a vibrating component, etc. I/O ports 1118 allow computing device 1100 to be logically coupled to other devices including I/O components 1120, some of which may be built in. Illustrative I/O components include a microphone, joystick, game pad, satellite dish, scanner, printer, wireless device, controller (such as a writing instrument, stylus, keyboard, and mouse), or natural user interface (NUI), etc. The I/O components 1120 may include surface sensor 1120a and ink digitizer 1120b. The surface sensor 1120a receives interaction from the writing instruments. In turn, the sensed interaction information may be digitized as a series of contact points by the ink digitizer 1120b. The contact points may be used as input for an ink rendering engine, described above.

The NUI processes gestures (e.g., hand, face, body, etc.), voice, or other physiological inputs generated by a user. Some of these inputs may be interpreted as digital ink that should be rendered on the digital ink-enable surface. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, and head and eye tracking associated with displays on the computing device 1100. The computing device 1100 may be equipped with depth cameras, such as stereoscopic camera systems, infrared camera systems, RGB camera systems, surface sensors, and combinations of these, for gesture detection and recognition. Additionally, the computing device 1100 may be equipped with accelerometers or gyroscopes that enable detection of motion or pressure. The output of the accelerometers or gyroscopes is provided to the memory for storage and processing. Additionally, the output of the accelerometers or gyroscopes is provided to the display of the computing device 1100 to render immersive augmented reality or virtual reality.

Radio 1124 transmits and receives radio communications. The computing device 1100 may be a wireless terminal adapted to received communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices (not shown in FIG. 11). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Embodiments of the technology described herein have been described in relation to particular embodiments, which are intended in all respects to be illustrative rather than restrictive. Alternative embodiments will become apparent to those of ordinary skill in the art to which the technology described herein pertains without departing from its scope.

It will be understood that certain features and subcombinations are of utility and may be employed without reference to other features and subcombinations. This is contemplated by and is within the scope of the claims.

What is claimed is:

1. A touchscreen display device, comprising:
a processor,
a touchscreen,
a computer storage having computer executable instructions that when executed by the processor performs a method for assigning pressure data to contact points, comprising:
receiving a first contact point from the touchscreen and determining that the touchscreen is not providing pressure data in association with the first contact point, wherein the first contact point is on a path made by an object across a surface of the touchscreen;
determining a velocity of the object at the first contact point;
determining a pressure that corresponds to the velocity by at least calculating a vector of the velocity in XY coordinates and calculating the pressure as the logarithm of the vector's absolute value;
associating the pressure with the first contact point to generate an updated first contact point; and
using the updated first contact point to render a digital ink.

2. The touchscreen display device of claim 1, wherein the method further comprises using the pressure associated with the updated first contact point to determine a thickness of the digital ink.

3. The touchscreen display device of claim 1, wherein the first contact point is used to render wet ink and the updated first contact point is used to render dry ink.

4. The touchscreen display device of claim 1, wherein the velocity is calculated by dividing a distance between the first contact point and an earlier contact point in a stroke by a sampling time for the touchscreen.

5. The touchscreen display device of claim 1, wherein the object is a stylus.

6. The touchscreen display device of claim 1, wherein the pressure and the velocity correspond such that a higher velocity results in a lower pressure.

7. The touchscreen display device of claim 1, wherein the object is a finger.

8. A computing device, comprising:
a processor,
a touchscreen,
a computer storage having computer executable instructions that when executed by the processor performs a method for assigning pressure data to contact points, comprising:
receiving a first contact point from the touchscreen and determining that the touchscreen is not providing pressure data in association with the first contact point, wherein the first contact point is on a path made by an object across a surface of the touchscreen;
determining a velocity of the object at the first contact point;
determining a pressure that corresponds to the velocity by at least calculating a vector of the velocity in XY coordinates and calculating the pressure as the logarithm of the vector's absolute value;
associating the pressure with the first contact point to generate an updated first contact point; and
using the updated first contact point to render a digital ink.

9. The computing device of claim 8, wherein the method further comprises using the pressure associated with the updated first contact point to determine a thickness of the digital ink.

10. The computing device of claim 8, wherein the first contact point is used to render wet ink and the updated first contact point is used to render dry ink.

11. The computing device of claim 8, wherein the velocity is calculated by dividing a distance between the first contact point and an earlier contact point in a stroke by a sampling time for the touchscreen.

12. The computing device of claim 8, wherein the object is a stylus.

13. The computing device of claim 8, wherein the pressure and the velocity correspond such that a higher velocity results in a lower pressure.

14. A method for assigning pressure data to contact points on a touchscreen, comprising:
receiving a first contact point from the touchscreen and determining that the touchscreen is not providing pressure data in association with the first contact point, wherein the first contact point is on a path made by an object across a surface of the touchscreen;
determining a velocity of the object at the first contact point;
determining a pressure that corresponds to the velocity by at least calculating a vector of the velocity in XY coordinates and calculating the pressure as the logarithm of the vector's absolute value;
associating the pressure with the first contact point to generate an updated first contact point; and
using the updated first contact point to render a digital ink.

15. The method of claim 14, wherein the method further comprises using the pressure associated with the updated first contact point to determine a thickness of the digital ink.

16. The method of claim 14, wherein the first contact point is used to render wet ink and the updated first contact point is used to render dry ink.

17. The method of claim 14, wherein the velocity is calculated by dividing a distance between the first contact point and an earlier contact point in a stroke by a sampling time for the touchscreen.

18. The method of claim 14, wherein the object is a stylus.

19. The method of claim 14, wherein the object is a finger.

20. The method of claim 14, wherein the pressure and the velocity correspond such that a higher velocity results in a lower pressure.

* * * * *